(12) United States Patent
Zhao et al.

(10) Patent No.: US 10,502,192 B2
(45) Date of Patent: Dec. 10, 2019

(54) ANTI-ICING WIND POWER BLADE AND BLADE DEICING AND HEATING METHOD

(71) Applicant: ZHUZHOU TIMES NEW MATERIALS TECHNOLOGY CO., LTD., Zhuzhou, Hunan (CN)

(72) Inventors: Jiangang Zhao, Zhuzhou (CN); Chaoyi Peng, Zhuzhou (CN); Wentao Yang, Zhuzhou (CN); Xian Wang, Zhuzhou (CN); Mingliang Xie, Zhuzhou (CN); Long Chen, Zhuzhou (CN); Jingcheng Zeng, Zhuzhou (CN)

(73) Assignee: ZHUZHOU TIMES NEW MATERIALS TECHNOLOGY CO., LTD., Zhuzhou, Hunan (CN)

( * ) Notice: Subject to any disclaimer, the term of this patent is extended or adjusted under 35 U.S.C. 154(b) by 339 days.

(21) Appl. No.: 15/521,960

(22) PCT Filed: Mar. 18, 2015

(86) PCT No.: PCT/CN2015/074499
§ 371 (c)(1),
(2) Date: Apr. 26, 2017

(87) PCT Pub. No.: WO2016/065807
PCT Pub. Date: May 6, 2016

(65) Prior Publication Data
US 2017/0314536 A1    Nov. 2, 2017

(30) Foreign Application Priority Data

Oct. 30, 2014    (CN) .......................... 2014 1 0594991

(51) Int. Cl.
*F03D 80/40*    (2016.01)
*F03D 1/06*     (2006.01)
*F03D 80/60*    (2016.01)

(52) U.S. Cl.
CPC ........... *F03D 80/40* (2016.05); *F03D 1/0675* (2013.01); *F03D 80/60* (2016.05)

(58) Field of Classification Search
CPC ........ F03D 80/60; F03D 80/40; F03D 1/0675; B64D 15/02
See application file for complete search history.

(56) References Cited

U.S. PATENT DOCUMENTS 7,217,091 B2 *  5/2007  LeMieux ................ F01D 11/00
                                                     415/905
8,475,129 B2 *  7/2013  Haans ................... F03D 1/0675
                                                     416/90 R
(Continued)

FOREIGN PATENT DOCUMENTS

CN    102434405 A    5/2012
CN    102661250 A    9/2012
(Continued)

OTHER PUBLICATIONS

International Search Report of PCT/CN2015/074499, dated Jul. 10, 2015. [PCT/ISA/210].

*Primary Examiner* — Dwayne J White
*Assistant Examiner* — Jackson N Gillenwaters
(74) *Attorney, Agent, or Firm* — Sughrue Mion, PLLC

(57) ABSTRACT

An anti-icing wind power blade, consisted of a wind turbine blade, wherein the wind turbine blade is provided with an anti-icing heating device, and wherein the anti-icing heating device consists of an air heating system and an electric heating system, wherein the two systems are independent from each other, without mutual interference, and heat the wind turbine blade separately or simultaneously. The air heating system and the electric heating system are both located inside the wind turbine blade, wherein the air heating system comprises an air heating control cabinet and an air heating device, and the electric heating system comprises an (Continued)

electric heating control cabinet and an electric heating element, the wind turbine blade is divided into a front edge and a back edge by a front edge web plate and a back edge web plate, wherein the air heating device is disposed in the back edge and the electric heating element is disposed on the outer surface of the front edge of the blade, and the air heating control cabinet and the electric heating control cabinet are disposed at the blade root. The current invention has an air heating system and an electric heating system. When the electric heating system malfunctions, the air heating system can automatically start and heat. As a result, the usage does not need to be stopped during repair, and the usage efficiency is increased, and is more appropriate for use in severe environment.

5 Claims, 1 Drawing Sheet

(56) References Cited

U.S. PATENT DOCUMENTS

| | | | | |
|---|---|---|---|---|
| 8,912,676 | B2* | 12/2014 | Matzen | H02P 9/02 290/44 |
| 9,664,178 | B2* | 5/2017 | Krainer | H01L 23/345 |
| 2008/0041483 | A1* | 2/2008 | Donnelly | F16L 11/081 138/122 |
| 2013/0022466 | A1* | 1/2013 | Laurberg | F03D 80/40 416/95 |
| 2013/0101414 | A1 | 4/2013 | Weitkamp et al. | |
| 2013/0106108 | A1* | 5/2013 | De Boer | F03D 7/045 290/44 |
| 2014/0322027 | A1 | 10/2014 | Lenschow | |
| 2016/0003223 | A1* | 1/2016 | Barth | F03D 1/0675 416/1 |

FOREIGN PATENT DOCUMENTS

| | | |
|---|---|---|
| CN | 103080537 A | 5/2013 |
| CN | 203130383 U | 8/2013 |
| CN | 103958890 A | 7/2014 |
| CN | 104018997 A | 9/2014 |
| DE | 20 2012 008 475 U1 | 11/2012 |
| WO | 2007/121501 A1 | 11/2007 |

* cited by examiner

ANTI-ICING WIND POWER BLADE AND BLADE DEICING AND HEATING METHOD

TECHNICAL FIELD

The current invention relates to components of a high power wind turbine generator system and its operation, and is especially related to a wind turbine blade of a high power wind turbine generator system and its heating method, wherein such wind turbine blade is provided with an anti-icing heating device in order to remove ice on the blade.

TECHNICAL FIELD

Wind power generation is a green energy generation method which has been drastically industrialized. With the fast development of the wind power generation, new markets with special environments for wind power have been developed. As a result, during the operation of the wind power generator, the wind turbine blades will experience the tests of all kinds of severe environments. Especially at wet and cold highlands, the wind turbine blades are very easily frozen in winter. After the blade freezes, the blade has a heavier load and its aerodynamic performance becomes worse, which has great influence on the safety and the power of the generator. In severe cases, it can cause a long stall of the generator, which results in damage to the blades and thus reduces its working life. Hence, it is of great importance to solve the freezing problem of the blade of the wind turbine generator.

There are many solutions proposed in the state of the art. In the patent application, CN02322405A, the heated air in the electric motor is conducted through a pipeline onto the blades for heating and realizes cooling of the electric motor at the same time. However, it does not disclose the detailed distribution of the pipelines for the heated air in the blade. The patent application, CN201363233, discloses an anti-icing wind turbine blade. The invention disposes resistors between the blades or on the surface of the blades for heating. The case of the blade comprises several layers, from the outer surface inward, the first layer is a glass fiber-reinforced plastic layer, the second layer is a layer consisted of resistors, and from the third layer to the inner cavity is the glass fiber-reinforced plastic layer. Alternatively, from the outer surface inward, the first layer is a layer of resistors disposed on the surface of the blade, and from the second layer inward is the glass fiber-reinforced plastic layer. Resin adhesive is used between the resistors and the glass fiber-reinforced plastic to glue them together. When it is cold and wet, the resistor is connected to the power supply and emit heat. The heat is transferred to the glass fiber-reinforced plastic layer in order to increase the temperature of the surface of the blade, so that the icing problem is solved. However, the resistors can easily be struck by lightning. In addition, malfunction of the resistors is also difficult to repair.

SUMMARY OF THE INVENTION

The goal of the invention is to solve the insufficient anti-icing capability of the wind turbine blade of the current high power wind turbine generator, and to provide a wind turbine blade for high power turbine generators as well as its operation, wherein the wind turbine blade of the current invention provides an improved anti-icing wind power blade structure in order to efficiently remove ice on the blade.

The goal is achieved through: An anti-icing wind power blade, comprising a wind turbine blade, wherein the wind turbine blade is provided with an anti-icing heating device, characterized in that the anti-icing heating device consists of an air heating system and an electric heating system, wherein the two systems are independent from each other, without mutual interference, and heat the wind turbine blade separately or simultaneously.

Further, the air heating system and the electric heating system are both located inside the wind turbine blade, wherein the air heating system comprises an air heating control cabinet and an air heating device, and the electric heating system comprises an electric heating control cabinet and an electric heating element, the wind turbine blade being divided into a front edge and a back edge by a front edge web plate and a back edge web plate, wherein the air heating device is disposed in the back edge and the electric heating element is disposed on the outer surface of the front edge of the blade, and the air heating control cabinet and the electric heating control cabinet are disposed at the blade root.

Further, a choke plate II is located between the blade tip of the front edge and the front edge web plate, a choke plate III is located between the blade root of the front edge and the front edge web plate, a guide duct is provided in the back edge web plate, wherein the guide duct is connected with the air heating system, and wherein a choke plate I is located between the two ends of the guide duct, and when the electric heating system malfunctions, the air heating system can automatically start the choke plate II and heat the front edge.

Further, the air heating system comprises a wind blower and a PTC heating device, and the electric heating element consists of carbon fiber composite, and the guide duct is fixed on the back edge web plate with handmade glass fabric, wherein the guide duct is made of fiberglass.

Further, the wind blower and the PTC heating device are fixed on the inner surface of the suction surface of the blade.

Use of the above anti-icing wind power blade, an air heating system and an electric heating system being located at a front edge and back edge of the wind turbine blade respectively of the high power wind turbine generator system, wherein the two systems are independent from each other and without mutual interference, when the wind turbine blade needs to be heated, the air heating system and the electric heating system being used to heat the wind turbine blade, wherein the heating unit of the electric heating system is disposed on the outer surface of the front edge of the blade and is responsible for preventing and removing ice, and the air heating system comprises an air heating device disposed at the blade root, and the air heating device conducts the heated air into the guide duct installed on the specified position of the back edge and heating is carried out by the heated air.

Further, a choke plate II is located between the blade tip of the front edge and the front edge web plate, a choke plate III is located between the blade root of the front edge and the front edge web plate, a guide duct is provided in the back edge web plate, the guide duct being connected with the air heating system, and wherein a choke plate I is located between the two ends of the guide duct, and when the electric heating system malfunctions, the air heating system can automatically start the choke plate II and heat the front edge.

Further, the air heating system works in the following manner: the wind blower brings cold air into the heating device, and the cold air is heated by the heating device, the heated air is then conducted to the specified position of the back edge of the blade via the guide duct, where there is the choke plate I at this specified position, so that the heated air can only blow toward the blade tip, and be recirculated back to the blade root through the middle of the web plate and be conducted into the next cycle by the wind blower, so that the closed cycle of "blade root-blade tip-blade root" is formed and the efficiency of heat utilization is increased.

Further, the heating device is a PTC heating device, and the wind blower and the PTC heating device are fixed on the inner surface of the suction surface of the blade.

The advantages of the current invention:

The current invention comprises an air heating system and an electric heating system, wherein these two systems are independent from each other and do not interfere with each other. However, when the electric heating system malfunctions, the air heating system automatically starts the choke plate II and heats the front edge.

The heating unit of the electric heating system is disposed on the outer surface of the front edge of the blade and is responsible for preventing and removing ice. Since the heating unit of the electric heating system is disposed on the outer surface of the blade, when the heating unit of the electric heating system malfunctions, repair is difficult. At this time, the choke plate II is automatically opened, and the choke plate Ill can be manually or automatically opened, and in this way, the heated air can enter the front edge, and a certain degree of anti-icing can be achieved.

The air heating system comprises the air heating system at the blade root, which sends the heated air into the guide duct at the specified position. The heating element is mainly made of PTC material. When the temperature increases, the power of such material also increases. When the temperature reaches certain value, the power of such material is gradually stable. As a result, such heating element is relatively safe.

More specifically, the wind blower brings cold air into the heating device, the cold air is heated by the heating device, and the heated air is then conducted to the specified position of the back edge of the blade via the guide duct, where there is the choke plate I at this specified position, so that the heated air can only blow toward the blade tip, and be recirculated back to the blade root through the middle of the web plate and be conducted into the next cycle by the wind blower, so that the closed cycle of "blade root-blade tip-blade root" is formed and the efficiency of heat utilization is increased.

FIGURES

In the figures: 5 air heating control cabinet; 6 wind blower; 7 heating device; 8 guide duct; 9 back edge; 10 choke plate I; 11 back edge web plate; 12 choke plate II; 13 electric heating element; 14 front edge; 15 front edge web plate; 16 choke plate III; 17 electric heating control cabinet.

EMBODIMENTS

The current invention is further illustrated through the following embodiments and figures.

Embodiment 1

Figure 1:
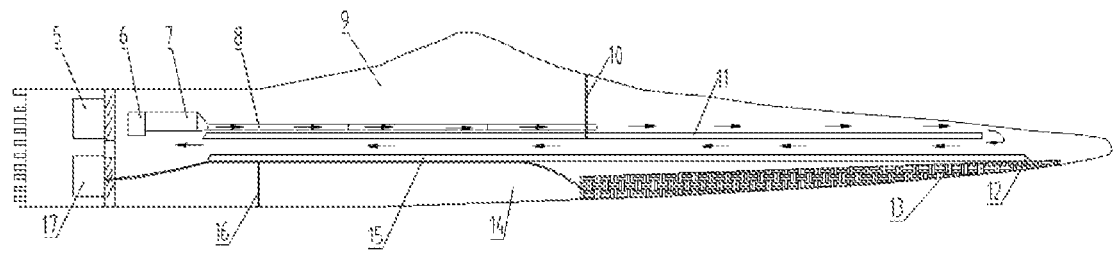
FIG. 1 shows the internal structure of the anti-icing wind blade of the current invention.
Figure 2:
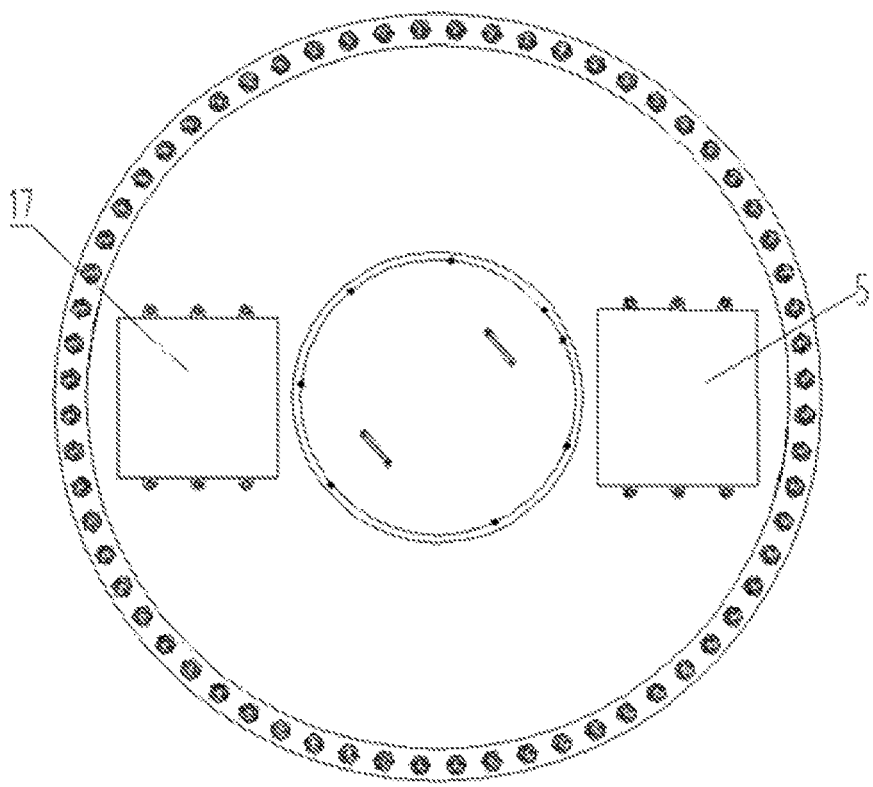
FIG. 2 shows the distribution of the baffle of the blade root of the anti-icing wind blade of the current invention.

According to FIG. 1 to FIG. 2, an anti-icing wind power blade, containing an air heating control cabinet 5, an air heating device, an electric heating control cabinet 17, an electric heating element 13, front and back edge web plate 15, 11, the wind turbine blade is divided into a front edge and a back edge 14, 9 by a front edge web plate and a back edge web plate 15, 11, wherein the electric heating element is disposed on the outer surface of the front edge of the blade 14, and the air heating system is disposed at the blade root. A choke plate II 12 is located between the blade tip of the front edge 14 and the front edge web plate 15, a choke plate III 16 is located between the blade root of the front edge 14 and the front edge web plate 15. A guide duct 8 is provided in the back edge web plate 11. The guide duct is fixed on the back edge web plate 11 with hand-layed glass fabric, wherein the guide duct is made of fiberglass. A choke plate 110 is located between the two ends of the guide duct 8. The air heating system comprises a wind blower 6 and a PTC heating device 7 and the electric heating element 13 consists of carbon fiber composite.

The electric heating unit 13 is disposed on the outer surface of the front edge of the blade and is responsible for preventing and removing ice. Since the heating unit of the electric heating system is disposed on the outer surface of blade, when the electric heating control cabinet 7 and the electric heating unit 13 malfunction, they are difficult to repair. In order to solve this problem, a choke plate II 12 is located between the blade tip of the front edge and the front edge web plate, a choke plate III 16 is located between the blade root of the front edge 14 and the front edge web plate. When the electric heating system works normally, the choke plate II 12 and the choke plate 16 are closed, and the heated air can only recirculate through the middle of the web plate. In this way, the two systems are independent from each other and do not interfere with each other. When the electric heating system malfunctions, the choke plate II 12 automatically opens, and the window of the choke plate III 16 is opened manually. The heated air enters the front edge 15 and also heats the front edge.

The wind blower 6 brings cold air into the heating device 7, and the cold air is heated by the heating device 7, the heated air is then conducted to the specified position of the back edge 9 of the blade via the guide duct 8, and there is the choke plate 110 at this specified position, so that the heated air can only blow toward the blade tip, and be recirculated back to the blade root through the middle of the web plate and be conducted into the next cycle by the wind blower 6, so that the closed cycle of "blade root-blade tip-blade root" is formed and the efficiency of heat utilization is increased.

The power supply of the system of the current invention is mainly located in the main control cabinet of the whole machine, and is connected to the electric heating control cabinet 17 and the air heating control cabinet 15 by the power cable through the slip ring channel and the wheel hub, and finally connected with the heating element 13 and the air heating system.

Through the above embodiments, the current invention relates to an anti-icing wind power blade, being consisted of a wind turbine blade, wherein the wind turbine blade is provided with an anti-icing heating device, characterized in that the anti-icing heating device consists of an air heating system and an electric heating system, wherein the two systems are independent from each other, without mutual interference, and heat the wind turbine blade separately or simultaneously.

Further, the air heating system and the electric heating system are both located inside the wind turbine blade, wherein the air heating system comprises an air heating control cabinet and an air heating device, and the electric heating system comprises an electric heating control cabinet and an electric heating element, the wind turbine blade being divided into a front edge and a back edge by a front edge web plate and a back edge web plate, wherein the air heating device is disposed in the back edge and the electric heating element is disposed on the outer surface of the front edge of the blade, and the air heating control cabinet and the electric heating control cabinet are disposed at the blade root.

Further, a choke plate II is located between the blade tip of the front edge and the front edge web plate, a choke plate III is located between the blade root of the front edge and the front edge web plate, a guide duct is provided in the back edge web plate, wherein the guide duct is connected with the air heating system, and wherein a choke plate I is located between the two ends of the guide duct, and when the electric heating system malfunctions, the air heating system can automatically start the choke plate II and heat the front edge.

Further, that the air heating system comprises a wind blower and a PTC heating device, and the electric heating element consists of carbon fiber composite, and the guide duct is fixed on the back edge web plate with handmade glass fabric, wherein the guide duct is made of fiberglass.

Further, the wind blower and the PTC heating device are fixed on the inner surface of the suction surface of the blade.

An air heating system and an electric heating system are located at the front edge and the back edge of the wind turbine blade of the high power wind turbine generator system respectively, wherein the two systems are independent from each other and without mutual interference, when the wind turbine blade needs to be heated, the air heating system and the electric heating system are used to heat the wind turbine blade, wherein the heating unit of the electric heating system is disposed on the outer surface of the front edge of the blade and is responsible for preventing and removing ice, and the air heating system comprises an air heating device disposed at the blade root, wherein the air heating device conducts the heated air into a guide duct installed on the specified position of the back edge and heating is carried out by the heated air.

Further, a choke plate II is located between the blade tip of the front edge and the front edge web plate, a choke plate III is located between the blade root of the front edge and the front edge web plate, a guide duct is provided in the back edge web plate, the guide duct being connected with the air heating system, and wherein a choke plate I is located between the two ends of the guide duct, and when the electric heating system malfunctions, the air heating system can automatically start the choke plate II and heat the front edge.

Further, the air heating system works in the following manner: the wind blower brings cold air into the heating device, and the cold air is heated by the heating device, the heated air is then conducted to the specified position of the back edge of the blade via the guide duct, where there is the choke plate I at this specified position, so that the heated air can only blow toward the blade tip, and be recirculated back to the blade root through the middle of the web plate and be conducted into the next cycle by the wind blower, so that the closed cycle of "blade root-blade tip-blade root" is formed and the efficiency of heat utilization is increased.

Further, the heating device is a PTC heating device, and the wind blower and the PTC heating device are fixed on the inner surface of the suction surface of the blade.

The advantages of the current invention:

The current invention comprises an air heating system and an electric heating system, wherein these two systems are independent from each other and do not interfere with each other. However, when the electric heating system malfunctions, the air heating system automatically starts the choke plate II and heats the front edge.

The heating unit of the electric heating system is disposed on the outer surface of the front edge of the blade and is responsible for preventing and removing ice. Since the heating unit of the electric heating system is disposed on the outer surface of the blade, when the heating unit of the electric heating system malfunctions, repair is difficult. At this time, the choke plate II is automatically opened, and the choke plate III can be manually or automatically opened, and in this way, the heated air can enter the front edge, and a certain degree of anti-icing can be achieved.

The air heating system comprises the air heating system at the blade root, which sends the heated air into the guide duct at the specified position. The heating element is mainly made of PTC material. When the temperature increases, the power of such material also increases. When the temperature reaches certain value, the power of such material is gradually stable. As a result, such heating element is relatively safe.

More specifically, the wind blower brings cold air into the heating device, the cold air is heated by the heating device, and the heated air is then conducted to the specified position of the back edge of the blade via the guide duct, where there is the choke plate I at this specified position, so that the heated air can only blow toward the blade tip, and be recirculated back to the blade root through the middle of the web plate and be conducted into the next cycle by the wind blower, so that the closed cycle of "blade root-blade tip-blade root" is formed and the efficiency of heat utilization is increased.

The invention claimed is:

1. An anti-icing wind power blade, comprising a wind turbine blade, wherein the wind turbine blade is provided with an anti-icing heating device, characterized in that the anti-icing heating device consists of an air heating system and an electric heating system, wherein the two systems are independent from each other, without mutual interference, and heat the wind turbine blade separately or simultaneously, wherein the air heating system and the electric heating system are both located inside the wind turbine blade, wherein the air heating system comprises an air heating control cabinet and an air heating device, and the electric heating system comprises an electric heating control cabinet and an electric heating element, the wind turbine blade being divided into a front edge and a back edge by a front edge web plate and a back edge web plate, wherein the air heating device is disposed in the back edge and the electric heating element is disposed on the outer surface of the front edge of the blade, and the air heating control cabinet and the electric heating control cabinet are disposed at the blade root, wherein a choke plate II is located between the blade tip of the front edge and the front edge web plate, a choke plate III is located between the blade root of the front edge and the front edge web plate, a guide duct is provided in the back edge web plate, wherein the guide duct is connected with the air heating system, and wherein a choke plate I is located between the two ends of the guide duct, wherein the air heating system comprises a wind blower and a PTC heating device, and the electric heating element consists of carbon fiber composite, and the guide duct is fixed on the back edge web plate with handmade glass fabric, wherein the guide duct is made of fiberglass.

2. The anti-icing wind power blade according to claim 1, characterized in that the wind blower and the PTC heating device are fixed on the inner surface of the suction surface of the blade.

3. A method for using the anti-icing wind power blade according to claim 1 to remove ice and to heat, an air heating system and an electric heating system being located at a front edge and back edge respectively of the wind turbine blade, wherein the two systems are independent from each other and without mutual interference, when the wind turbine blade needs to be heated, the air heating system and the electric heating system being used to heat the wind turbine blade, wherein the electric heating system is disposed on the outer surface of the front edge of the blade and is responsible for preventing and removing ice, and the air heating system comprises an air heating device disposed at the blade root, and the air heating device conducts heated air into the guide duct installed on the specified position of the back edge and heating is carried out by the heated air.

4. The method for using the anti-icing wind power blade to remove ice and to heat according to claim 3, characterized in that the air heating system works in the following manner: the wind blower brings cold air into the heating device, and the cold air is heated by the heating device, the heated air is then conducted to the specified position of the back edge of the blade via the guide duct, where there is the choke plate I at this specified position, so that the heated air can only blow toward the blade tip, and be recirculated back to the blade root through the middle of the web plate and be conducted into the next cycle by the wind blower, so that the closed cycle of "blade root-blade tip-blade root" is formed and the efficiency of heat utilization is increased.

5. The method for using the anti-icing wind power blade to remove ice and to heat according to claim 4, characterized in that the heating device is a PTC heating device, and the wind blower and the PTC heating device are fixed on the inner surface of the suction surface of the blade.

* * * * *